(12) United States Patent
Yun

(10) Patent No.: US 6,999,586 B2
(45) Date of Patent: Feb. 14, 2006

(54) MOBILE PHONE HAVING A DETACHABLE KEYPAD AND THE DETACHABLE KEYPAD THEREOF

(75) Inventor: Tae-Sik Yun, Suwon-shi (KR)

(73) Assignee: Samsung Electronics Co., Ltd., (KR)

( * ) Notice: Subject to any disclaimer, the term of this patent is extended or adjusted under 35 U.S.C. 154(b) by 503 days.

(21) Appl. No.: 10/085,599

(22) Filed: Feb. 27, 2002

(65) Prior Publication Data

US 2002/0118824 A1    Aug. 29, 2002

(30) Foreign Application Priority Data

Feb. 28, 2001  (KR) ............................... 2001-10566

(51) Int. Cl.
*H04M 1/00*    (2006.01)
(52) U.S. Cl. .................. 379/444; 379/430; 379/433.07
(58) Field of Classification Search ................ 379/444, 379/430, 446, 433.07
See application file for complete search history.

(56) References Cited

U.S. PATENT DOCUMENTS

| | | | | |
|---|---|---|---|---|
| 3,757,048 A | * | 9/1973 | McAvoy et al. | 379/93.37 |
| 5,561,710 A | * | 10/1996 | Helms | 379/93.27 |
| 5,812,659 A | * | 9/1998 | Mauney et al. | 379/430 |
| 6,149,116 A | * | 11/2000 | Won | 248/309.4 |

* cited by examiner

*Primary Examiner*—Jack Chiang
(74) *Attorney, Agent, or Firm*—Dilworth & Barrese LLP

(57) ABSTRACT

Disclosed are a detachable keypad and a mobile phone with the detachable keypad. The detachable keypad includes an earphone-microphone jack, a key array, and a DTMF generator. When a key is pressed while an earphone plug is inserted into the earphone-microphone jack, a DTMF signal corresponding to the pressed key is transmitted to a microphone of a mobile phone through an earphone-microphone speaker. In the mobile phone, an earphone-microphone speaker fixing portion fixes an earphone-microphone speaker at a position suitable for a microphone to receive sound from the earphone-microphone speaker. An audio/DTMF separator separates a signal received at the microphone into an audio signal and a DTMF signal. A controller analyzes the DTMF signal and performs an operation according to the analysis result.

7 Claims, 3 Drawing Sheets

MOBILE PHONE HAVING A DETACHABLE KEYPAD AND THE DETACHABLE KEYPAD THEREOF

PRIORITY

This application claims priority to an application entitled "Mobile Phone Having Detachable Keypad and the Detachable Keypad" filed in the Korean Industrial Property Office on Feb. 28, 2001 and assigned Ser. No. 2001-10566, the contents of which are hereby incorporated by reference.

BACKGROUND OF THE INVENTION

1. Field of the Invention

The present invention relates generally to a keypad for a mobile phone, and in particular, to a mobile phone with a detachable keypad and the detachable keypad.

2. Description of the Related Art

A mobile phone user calls or answers a call or makes actions necessary for communicating by pressing keys. The user presses keys directly when using a bar-type mobile phone because its keypad is exposed, whereas the user must open a flip or a folder before using a keypad with a flip-type or folder-type mobile phone. In its internal structure, a keypad is connected to a key sensing port of a modem chip. Therefore, the keypad is bound to exist within a board. This integration of the keypad into the mobile phone sets some limitations in the effective use of the mobile phone.

Along with the recent technological developments and user demands, mobile phones have shrunk down in size and become more lightweight. As a result, the keypads have also been miniaturized. However, a keypad that is too small may make it inconvenient for some users having large fingers to press keys. However, a large keypad may impair the convenience and appearance of the mobile phone. Moreover, a keypad is not an easy tool to access the Internet with because no mouse is available as with a computer keyboard.

SUMMARY OF THE INVENTION

It is, therefore, an object of the present invention to provide a mobile phone having a detachable keypad.

The above and other objects can be achieved by providing a detachable keypad and a mobile phone with the detachable keypad. The detachable keypad includes an earphone-microphone jack, a key array, and a DTMF (Dual Tone Multi-Frequency) generator. When a key is pressed with an earphone plug inserted into the earphone-microphone jack, a DTMF signal corresponding to the pressed key is transmitted to a microphone of a mobile phone through an earphone-microphone speaker. In the mobile phone, an earphone-microphone speaker fixing portion fixes an earphone-microphone speaker at a position suitable for a microphone to sense sound from the earphone-microphone speaker. An audio/DTMF separator separates a signal sensed at the microphone into an audio signal and a DTMF signal. A controller analyzes the DTMF signal and performs an operation according to the analysis result.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

A preferred embodiment of the present invention will be described hereinbelow with reference to the accompanying drawings. In the following description, well-known functions or constructions are not described in detail since they would obscure the invention in unnecessary detail.

Figure 1:
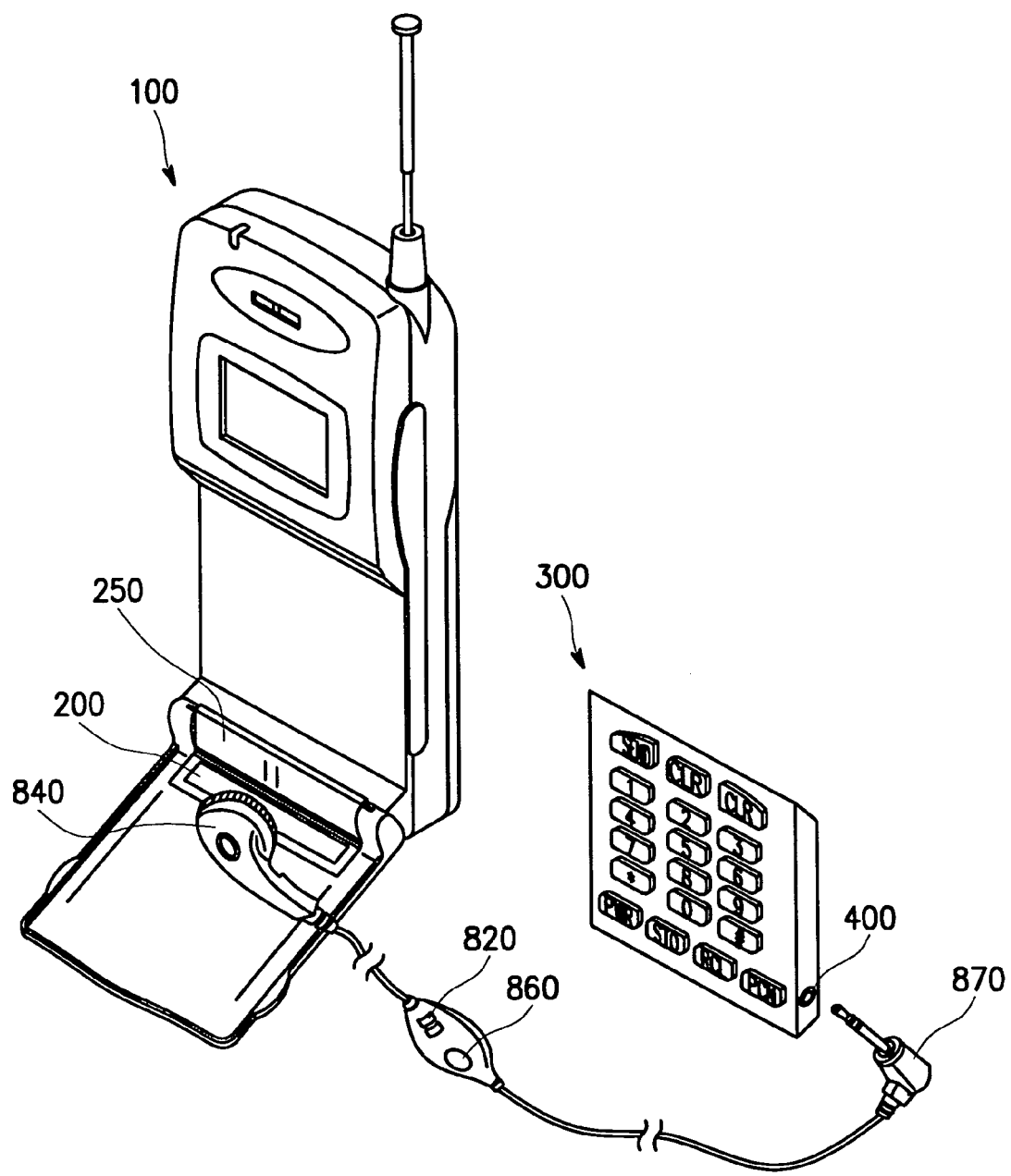
FIG. 1 illustrates a detachable keypad and a mobile phone according to an embodiment of the present invention.

FIG. 1 illustrates a detachable keypad and a mobile phone according to an embodiment of the present invention. In FIG. 1, reference numeral 100 denotes a mobile phone with a detachable keypad, reference numeral 200 denotes a magnet attached to a flip, reference numeral 300 denotes the detachable keypad, and reference numeral 400 denotes an earphone-microphone jack positioned on a side surface of the detachable keypad 300.

Reference numerals 820, 840, 860, and 870 are earphone-microphone components, that is, a microphone, a speaker, a button, and an earphone-microphone plug, respectively.

When a key is pressed in the keypad 300 with the earphone-microphone plug 870 inserted into the earphone-microphone jack 400, a DTMF (Dual Tone Multi-Frequency) signal is received at the microphone 250 of a mobile phone 100 through a speaker 840.

Figure 2:
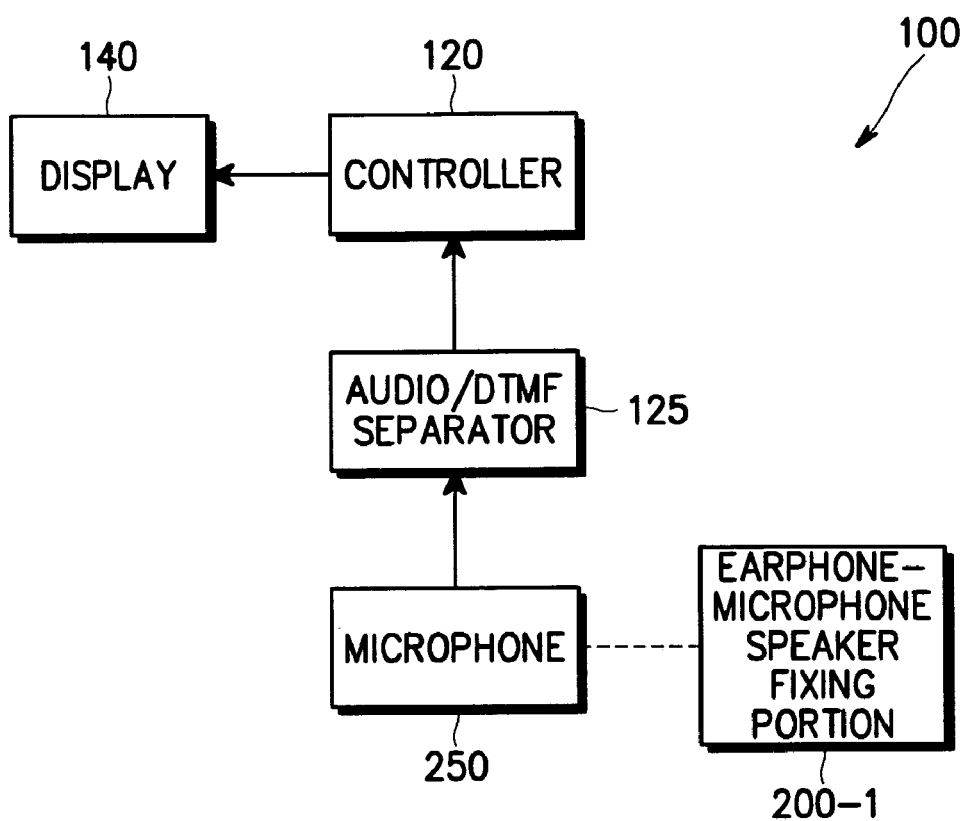
FIG. 2 is a block diagram of the mobile phone illustrated in FIG. 1.

FIG. 2 is a block diagram of the mobile phone illustrated in FIG. 1. Referring to FIG. 2, an earphone-microphone speaker fixing portion 200-1 fixes the earphone-microphone speaker 840 at a position suitable for a microphone 250 to sense sound from the speaker 840. In the preferred embodiment, the earphone-microphone speaker fixing portion 200-1 is the magnet 200 on the flip. The magnet 200 must be highly magnetic relative to known magnets, but not too magnetic to influence other components. While not shown, the earphone-microphone speaker fixing portion 200-1 can also be embodied as a mechanical holder.

An audio/DTMF separator 125 separates a signal sensed at the microphone 250 into an audio signal and a DTMF signal. A controller 120 analyzes the DTMF signal and performs a corresponding operation. That is, if the DTMF signal represents a digit or a character, the controller 120 controls a display 140 to display the digit or character. If the DTMF signal represents a command for an operation, the controller 120 performs the requested operation.

Figure 3:
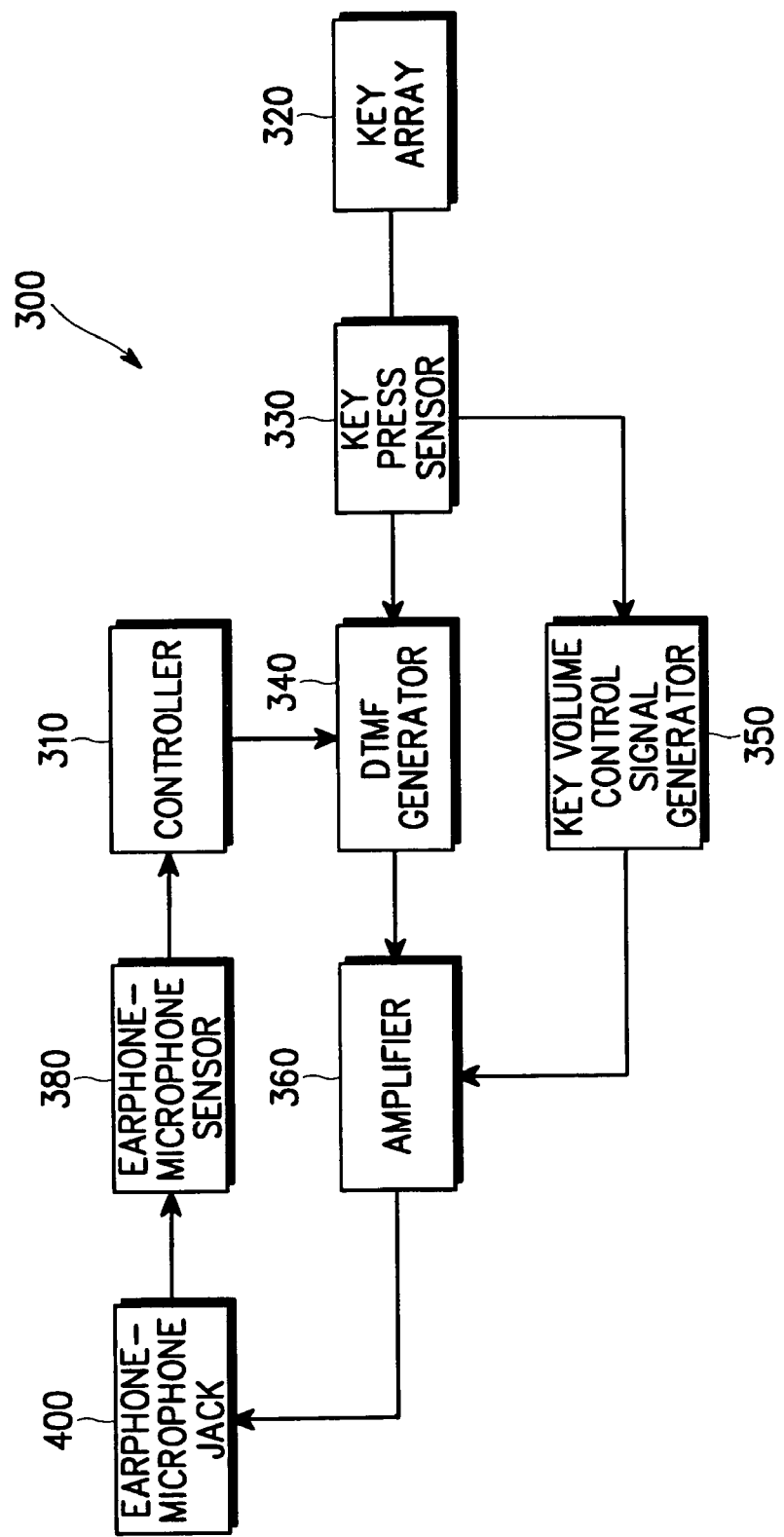
FIG. 3 is a block diagram of the detachable keypad illustrated in FIG. 1.

FIG. 3 is a block diagram of the detachable keypad illustrated in FIG. 1. Referring to FIG. 3, an earphone-microphone sensor 380 checks whether the earphone-microphone plug 870 is inserted into the earphone-microphone jack 400. A key press sensor 330 senses pressing of each key from a key array 320 and a DTMF generator 340 generates a DTMF signal according to the key press sensed by the key press sensor 330. If the pressing of a key is sensed with the earphone-microphone plug 870 inserted into the earphone-microphone jack 400, a controller 310 controls the DTMF generator 340 to generate a DTMF signal corresponding to the pressed key and transmits the DTMF signal to the earphone-microphone speaker 840 through earphone-microphone jack 400 and the earphone-microphone plug 870.

A key volume control signal generator 350 generates a key volume control signal if the key press sensor 330 senses an input of a key volume control key. An amplifier 360 amplifies the DTMF signal received from the DTMF generator 340 by a predetermined level in response to the key volume control signal and transmits the amplified DTMF signal to the earphone-microphone jack 400. The key volume control signal enables the microphone 250 to receive the DTMF signal better.

In accordance with the present invention as described above, a keypad can be detached from a mobile phone. Therefore, the mobile phone can be designed to meet a user's specifications. For example, a keypad with small touch areas can be fabricated for women or others having small fingers. Alternatively, a keypad with relatively large touch areas can be fabricated for men or others having large fingers. The detachability of the keypad from the mobile phone also enables the mobile phone to be made in diverse colors or shapes. Moreover, since the keypad can be designed separately like an accessory, a variety of functions can be selectively added to the keypad, and function compatibility or merging is readily ensured. If a display (LCD) is disposed in the place of an existing keypad, the mobile phone can be further miniaturized.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A keypad capable of being attached and detached from a mobile phone, the keypad for transmitting DTMF signals to the mobile phone, the keypad comprising:
   an earphone-microphone jack;
   a key array; and
   a DTMF (Dual Tone Multi-Frequency) generator,
   wherein when the keypad is detached from the mobile phone and a key of the key array is pressed while an earphone plug of an earphone-microphone set is inserted into the earphone-microphone jack, a DTMF signal is generated by the DTMF generator corresponding to the pressed key and is transmitted to a microphone of the mobile phone through an earphone-microphone speaker of the earphone-microphone set.

2. A mobile phone comprising:
   a microphone;
   an earphone-microphone speaker fixing portion for fixing an earphone-microphone speaker at a position enabling the microphone to receive sound from the earphone-microphone speaker;
   an audio/DTMF (Dual Tone Multi-Frequency) separator for separating a signal received at the microphone into an audio signal and a DTMF signal; and
   a controller for analyzing the DTMF signal and performing an operation according to the analyzed DTMF signal.

3. The mobile phone of claim 2, further comprising a display, wherein the controller analyzes the DTMF signal and if the DTMF signal represents a digit or a character, the controller controls the display to display the digit or character.

4. The mobile phone of claim 2, wherein the earphone-microphone speaker fixing portion is a magnet.

5. A keypad capable of being attached and detached from a mobile phone, the keypad for transmitting DTMF signals to the mobile phone, the keypad comprising:
   an earphone-microphone jack;
   an earphone-microphone sensor for checking whether an earphone-microphone plug of an earphone-microphone set is inserted into the earphone-microphone jack;
   a key array;
   a key press sensor for sensing the pressing of each key of the key array;
   a DTMF (Dual Tone Multi-Frequency) generator for generating a DTMF signal; and
   a controller for controlling the DTMF generator to generate a DTMF signal corresponding to a pressed key if pressing of the key is sensed while the keypad is detached from the mobile phone and the earphone-microphone plug of the earphone-microphone set is inserted into the earphone-microphone jack, and for transmitting the DTMF signal to an earphone-microphone speaker of the earphone-microphone set through the earphone-microphone jack and plug.

6. The keypad of claim 5, further comprising:
   a key volume control signal generator for generating a key volume control signal if the key press sensor senses input of a key volume control key; and
   an amplifier for amplifying the DTMF signal received from the DTMF generator by a predetermined level in response to the key volume control signal.

7. A mobile phone with a keypad capable of being detached from the mobile phone comprising:
   a microphone;
   an earphone-microphone speaker fixing portion for fixing an earphone-microphone speaker at a position enabling the microphone to receive sound from the earphone-microphone speaker;
   an audio/DTMF (Dual Tone Multi-Frequency) separator for separating a signal received at the microphone into an audio signal and a DTMF signal; and
   a controller for analyzing the DTMF signal and performing an operation according to the analyzed DTMF signal;
   wherein the detachable keypad comprises an earphone-microphone jack, a key array, and a DTMF (Dual Tone Multi-Frequency) generator, wherein when a key is pressed while an earphone plug is inserted into the earphone-microphone jack, a DTMF signal is generated by the DTMF generator corresponding to the pressed key and is transmitted to the microphone of a mobile phone through the earphone-microphone speaker.

* * * * *